W. H. ORPEN, Jr.
MOLD FOR LINOTYPE MACHINES.
APPLICATION FILED JULY 12, 1912.
1,129,829.
Patented Feb. 23, 1915.
2 SHEETS—SHEET 1.
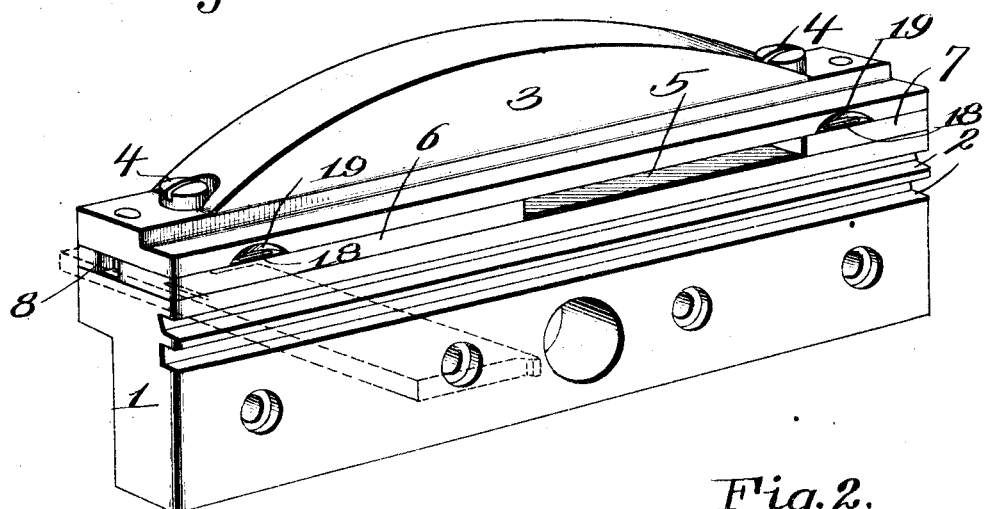
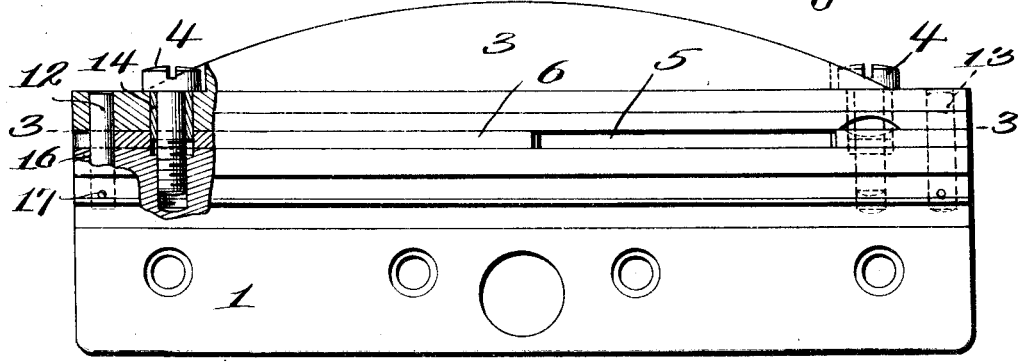
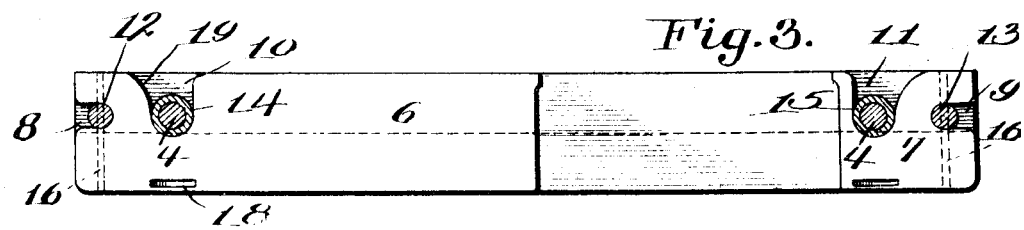
WITNESSES:
INVENTOR
William H. Orpen Jr.
BY
ATTORNEY

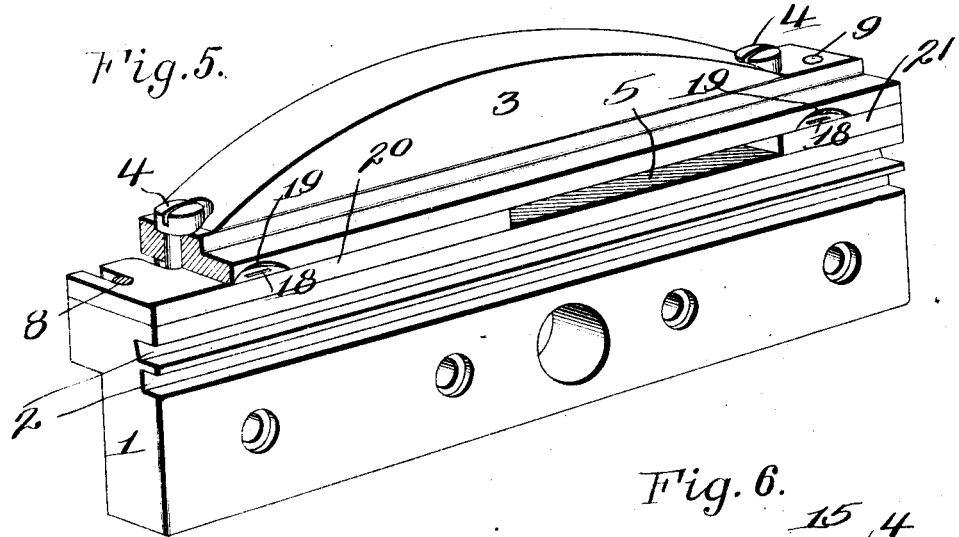
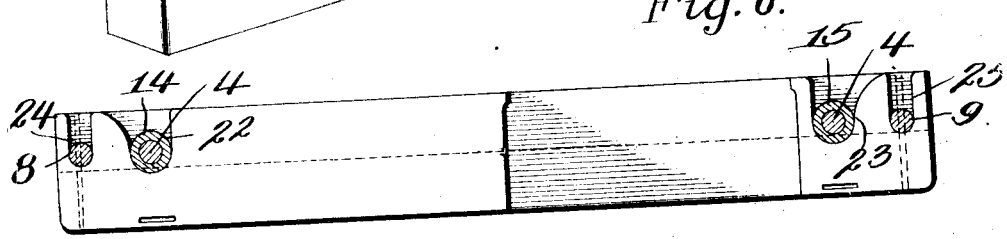
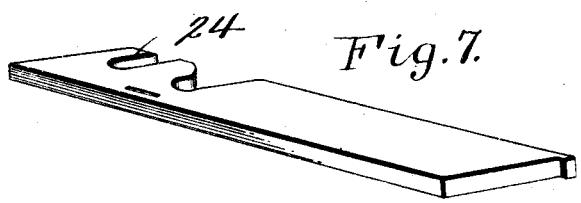
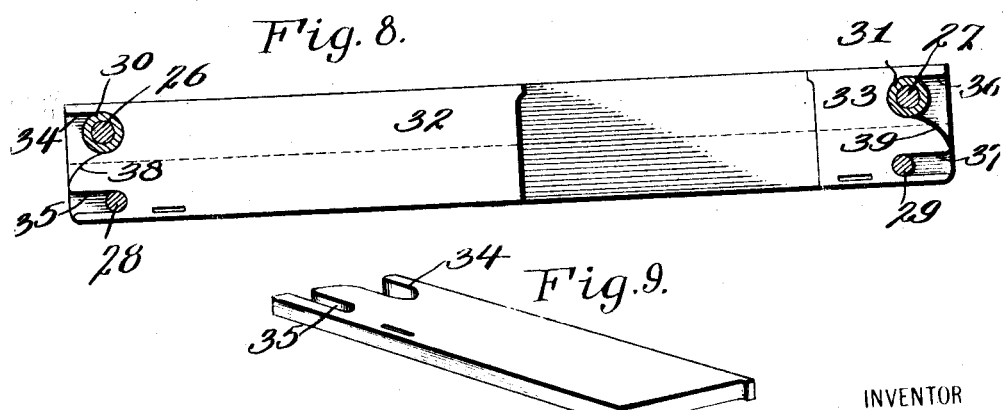

UNITED STATES PATENT OFFICE.

WILLIAM H. ORPEN, JR., OF BROOKLYN, NEW YORK, ASSIGNOR TO INTERNATIONAL TYPESETTING MACHINE COMPANY, OF NEW YORK, N. Y., A CORPORATION OF NEW YORK.

MOLD FOR LINOTYPE-MACHINES.

1,129,829.  Specification of Letters Patent.  Patented Feb. 23, 1915.

Application filed July 12, 1912. Serial No. 709,095.

*To all whom it may concern:*

Be it known that I, WILLIAM H. ORPEN, Jr., a citizen of the United States, residing at Brooklyn, in the county of Kings and State of New York, have invented new and useful Improvements in Molds for Linotype-Machines, of which the following is a specification.

This invention relates to improvements in linotype machines and more particularly to the line-casting mold thereof, and the primary object of the invention is to provide an improved mold construction which enables the liners employed to space the cap and body of the mold and to determine the length of the line of type, to be inserted and removed easily and with facility, and when inserted the liners are located accurately in directions both longitudinally and transversely of the mold, thereby insuring the production of a line of type or slug possessing the desired dimensions, it being unnecessary in the preferred embodiment of the invention to detach the mold cap from the body in attaching the liners to obtain different desired mold adjustments.

To these and other ends, the invention consists in certain improvements, and combinations and arrangements of parts, all as will be hereinafter more fully described, the novel features being pointed out particularly in the claims at the end of the specification.

In the accompanying drawing: Figure 1 is a perspective view of a type-casting mold constructed in accordance with the preferred embodiment of the invention; Fig. 2 represents a front elevation, partly in section, of the mold as shown in Fig. 1; Fig. 3 represents a section on the line 3—3 of Fig. 2; Fig. 4 is a perspective view of one of the liners removed from the mold; Fig. 5 is a perspective view, partly in section, of a type-casting mold showing another form of the invention; Fig. 6 represents a horizontal section through the mold as shown in Fig. 5 and taken in the plane of the top surfaces of the liners; Fig. 7 is a perspective view of one of the liners adapted to be used with the constructions shown in Figs. 5 and 6; Fig. 8 represents a transverse section of a mold showing another form or embodiment of the invention; and Fig. 9 is a perspective view of one of the liners adapted to be used with the construction shown in Fig. 8.

Similar parts are designated by the same reference characters in the several views.

A mold of the same general construction as that used ordinarily on the well known linotype machines is shown in the accompanying drawing and will be described hereinafter in detail, the improvements embodying the present invention being applied thereto. It will be understood, however, that different constructions may be adopted in carrying the invention into practice embodying the principles and the essential features of the invention. In the present instance, 1 designates the body of the mold which in the drawing is of the form usually employed upon the well known linotype machine, the face of the body having ledges 2 constituting matrix keepers which serve to position the line of matrices in proper casting position with respect to the mold, and a cap 3 serves to close the top of the mold, a pair of screws 4 being employed in the present instance to clamp the mold body and cap together, the mold cavity 5 being formed as usual between the body and the cap.

According to the present invention, the liners 6 and 7 which are interposed between the mold body and cap and which serve to space properly the distance between these parts of the mold as well as to gage accurately the length of the line of type to be cast are of improved construction and coöperate with devices on the mold whereby these liners may be removed and inserted readily and with facility and accurately positioned in directions both longitudinally and transversely of the mold. In the construction shown, these liners have longitudinally extending slots or recesses 8 and 9 which extend inwardly from the outer ends of the liners and the latter are also formed with transversely extending slots or recesses 10 and 11 which extend inwardly from the adjacent lateral edges of the liners. These slots in the liners which open to adjacent edges thereof coöperate with devices on the mold to produce the results before stated, there being a pair of dowel pins 12 and 13 suitably fixed to the mold toward its opposite ends to engage in the respective end slots 8 and 9 of the liners and an additional pair of dowels 14 and 15 to engage the laterally opening slots 10 and 11 of the liners. These latter dowels 14 and 15 are preferably made hollow to permit the clamping screws 4 to pass through them and are made sufficiently long to project somewhat below the lower surface of the mold cap. It is obvious, however, that the clamping screws themselves may coöperate with the walls of the laterally opening slots in the liners and the hollow dowels may then be omitted or, the dowels may be made solid and placed beside the clamping screws.

The projections formed by the dowels 12 and 13, and 14 and 15 may be secured in any suitable way to the mold, in the present instance the dowels 12 and 13 are fitted in alined apertures 16 in the mold body and cap and are fastened or locked in position by the keys 17 which may be extended as shown through the walls of the mold body, and the hollow dowels 14 and 15 are held in position by being tightly fitted and forced into place. The liners are inserted and removed by edgewise movements thereof in appropriate directions, and to facilitate removal of these liners, each of them may be provided with a notch 18 and the mold cap may be formed with recesses 19 which expose the notches in the respective liners when the latter are in operative position, as shown in Fig. 1, and enabling a suitable implement to be inserted into the notch of each liner and to thereby remove it from its position between the mold body and cap. In a mold of this construction, each liner may be readily inserted between the mold body and cap while the clamping screws are loosened by first inserting the notched end of the liner in a manner to cause the end notch 8, for example, to receive the pin or projection 12, as shown by the dotted lines in Fig. 1, and then swinging the liner into the place between the mold body and cap about the pin 12 as a pivot or center, this pin 12 bearing against the inner end of the slot 8, and as the liner assumes a position in longitudinal alinement with the mold, the hollow dowel 14 will enter the laterally opening slot 10, this dowel abutting against the inner end of the slot 10 the moment the liner assumes a position in proper alinement with the mold. The side and end slots in each liner and the coöperating projections formed by the dowels are so spaced and located that when the liner is swung into alinement with the mold further movement of the liner will be prevented and the liner will be positioned accurately in directions both longitudinally and transversely of the mold. To facilitate entrance of the hollow dowel 14 in the laterally opening slot 10, the wall 19 of the laterally opening slot 10, which is adjacent to the slot 8, is formed on a radius. When the liners are inserted and occupy a proper operative position, they are retained in such position by tightening of the clamping screws 4, and in order to remove the liners, it is only necessary to loosen the screw 4 sufficiently to relieve the pressure or clamping action upon the liners whereupon the latter may be swung laterally from the mold and removed by an operation which is the reverse of that employed in inserting the liners. It is to be observed that mere loosening of the clamping screws is sufficient to permit replacing of the liners, that is to say, it is unnecessary to remove or detach the mold cap from the clamping screws with respect to the mold body.

The foregoing describes particularly the construction shown in Figs. 1 to 4 inclusive, but it is obvious that various modifications may be employed based upon the same principle, Figs. 5 to 9 inclusive being examples of such modifications.

In the construction shown in Figs. 5 to 7 inclusive, the mold body 1 formed with the matrix keepers 2, the mold cap 3, and the clamping screws 4 may correspond substantially to such parts as shown in the preceding figures, and in this modified construction, the dowels 8 and 9 and the hollow dowels 14 and 15 are used, these dowels being located in this instance substantially as in the preceding embodiment of the invention. The liners 20 and 21, however, are formed somewhat differently, that is to say, these liners are formed with laterally opening slots 22 and 23 which correspond to the laterally opening slots 10 and 11 of the liners 6 and 7 and coöperate with the hollow dowels 14 and 15, and these liners are formed with laterally opening slots 24 and 25 to receive the dowels 8 and 9. The liners in this embodiment of the invention may be readily inserted and removed in substantially the same manner as the liners shown in Figs. 1 to 4 inclusive, that is to say, by first engaging the dowels 8 and 9 in the slots 24 and 25 of the liners while the latter are placed at an angle to the length of the mold, and then swinging the liners toward operative position, thereby causing the hollow dowels 14 and 15 to enter the slots 22 and 23 whereby the liners are accurately positioned in directions both longitudinally and transversely of the mold.

In that form of the invention shown in Figs. 8 and 9, the clamping screws 26 and 27 and the dowels 28 and 29 are spaced in a direction laterally of the mold, the clamping screws being shown provided with hollow dowels 30 and 31. The liners 32 and 33 in this embodiment of the invention have pairs of slots 34 and 35 and 36 and 37 respectively which extend inwardly from the outer ends of the liners, those walls of the slots 34 and 36 adjacent to the slots 35 and 37 respectively being curved, as shown at 38 and 39, to facilitate the entrance of the hollow dowels 30 and 31 into the respective slots when the liners are swung about the pins 28 and 29 respectively as centers. The liners as shown in this form of the invention may also be inserted and removed readily by swinging movements, the liners being applied, for example, by engaging the slots 35 and 37 with the dowels 28 and 29 while the liners extend substantially at right angles to the mold, and then swinging the liners inwardly or toward operative position, the dowels 30 and 31 then entering the slots 34 and 36 and positioning the liners in directions both longitudinally and transversely of the mold. Obviously, the liners may be removed by a reverse order of operation. In both modifications, the liners may be removed and inserted without the necessity of removing or detaching the mold cap, that is to say, it is only necessary to loosen the clamping screws when it is desired to insert or remove the liners, and tightening of these screws serves to firmly secure the liners in operative position.

What is claimed is:—

1. A linotype mold embodying a liner having open slots or recesses which extend respectively into a side and an end thereof and are adapted to engage with projections in the mold, thereby positioning the liner longitudinally and transversely when it is inserted between the mold cap and body.

2. A linotype mold embodying a liner adapted for insertion edgewise between the mold members and having open slots or recesses extending at different angles relatively to the liner whereby it is properly positioned longitudinally and transversely, and devices within the mold to engage the respective slots and to position the liner in the mold.

3. In a linotype machine, a mold embodying in combination a mold body, a mold cap, projections extending between the body and cap, and a liner having slots open respectively at the side and end edges thereof and adapted to engage said projections whereby the liner may be located in operative position between the mold body and cap and removed and inserted edgewise without withdrawing or disturbing said projections.

4. In a linotype machine, a casting mold embodying a body, a cap, and liners forming a mold cavity between them, a pair of projections extending between said body and cap beyond each end of said cavity, the liners adapted to be inserted edgewise and rotated between said body and cap and having slots one to receive and coöperate with one of said projections when the liner is inserted edgewise to position the liner transversely, and the other slot to receive the other projection when the liner is rotated to position the same longitudinally with respect to the mold.

5. In a line casting mold, the combination of a mold body, a mold cap, a pair of projections extending between the said body and cap, and a liner having open slots to receive the respective projections between the mold cap and body, the liners being inserted edgewise between them, one of said projections forming a pivot about which the liner swings and serving to position the liner longitudinally of the mold, and the other projection serving to position the liner in a direction transversely of the mold.

In testimony whereof I have hereunto set my hand in presence of two subscribing witnesses.

WILLIAM H. ORPEN, Jr.

Witnesses:
W. S. SCUDDER,
C. HANSEN.